US010690557B2

(12) United States Patent
Pence et al.

(10) Patent No.: US 10,690,557 B2
(45) Date of Patent: Jun. 23, 2020

(54) POTTED LOAD CELL

(71) Applicant: Cardinal Scale Manufacturing Company, Webb City, MO (US)

(72) Inventors: Brian Matthew Pence, Webb City, MO (US); Thomas Erich Schuller, Webb City, MO (US)

(73) Assignee: Cardinal Scale Manufacturing Company, Webb City, MO (US)

( * ) Notice: Subject to any disclaimer, the term of this patent is extended or adjusted under 35 U.S.C. 154(b) by 133 days.

(21) Appl. No.: 15/933,733

(22) Filed: Mar. 23, 2018

(65) Prior Publication Data

US 2019/0293504 A1  Sep. 26, 2019

(51) Int. Cl.
*G01L 5/00* (2006.01)
*G01L 1/16* (2006.01)
*G01L 1/22* (2006.01)

(52) U.S. Cl.
CPC .............. *G01L 5/0004* (2013.01); *G01L 1/16* (2013.01); *G01L 1/2206* (2013.01)

(58) Field of Classification Search
CPC ........ G01L 5/0004; G01L 1/16; G01L 1/2206
USPC .................... 73/862.627, 760, 795
See application file for complete search history.

(56) References Cited

U.S. PATENT DOCUMENTS

| 4,364,279 | A  | * | 12/1982 | Stern | ..................... G01L 1/2225 338/5 |
| 5,811,738 | A  | * | 9/1998 | Boyovich | .............. G01G 19/12 177/136 |
| 6,118,083 | A  | * | 9/2000 | Boyovich | .............. G01G 19/12 177/136 |
| 8,136,408 | B2 | * | 3/2012 | Arms | ....................... G01B 7/16 73/765 |

* cited by examiner

*Primary Examiner* — Suman K Nath
(74) *Attorney, Agent, or Firm* — Hovey Williaims LLP (57) ABSTRACT

A load cell for measuring a force applied thereto by an object for determining a weight of the object. The load cell includes a rigid block having a number of interconnected cavities having a strain gage pocket, a strain gage positioned in the strain gage pocket, and potting material filling the interconnected cavities such that moisture and debris cannot enter the strain gage pocket.

9 Claims, 9 Drawing Sheets

POTTED LOAD CELL

BACKGROUND

Load cells are commonly used for measuring the weight of an object. They typically include strain gages and electronic circuits mounted in strain gage pockets of a rigid block. The strain gages and electronic circuits are coated with potting material to protect them from moisture, which can cause erroneous measurements and damage the circuits. However, moisture can still reach the strain gage pockets via cable tunnels that accommodate electronic cables and wires. Worse still, moisture can be wicked along the cables and wires and under the potting material coating into direct contact with the strain gages and electronic circuits.

Covers can be secured over the strain gage pockets via fasteners, welding, or a separate adhesive for added protection against moisture. However, this adds significant material costs and manufacturing time and does not prevent moisture from reaching the strain gages and electronic circuits via the cables and wires.

SUMMARY

Embodiments of the present invention solve the above-described and other problems and limitations by providing a load cell, and a method for constructing the same, that prevents moisture from reaching the load cell's strain gages and electronic circuits.

An embodiment of the load cell broadly includes a block, a number of strain gages and electronic circuits, a potting material, and a number of covers. The load cell is configured to be connected between a load cell stand and a weighbridge for measuring a force applied thereto by an object for determining a weight of the object. The load cell may be a shear beam load cell, a double-ended shear beam load cell, a compression load cell, an S-type load cell, a load pin load cell, or any other type of load cell.

The block houses or otherwise supports the strain gages and electronic circuits and includes a first set of strain gage pockets, a second set of strain gage pockets, a set of cable tunnels, a set of electronics interconnect tunnels, a set of inlet potting tunnels, a set of intermediate potting tunnels, and a set of outlet potting tunnels. The block may be constructed to withstand between a few pounds and the weight of a large object such as a loaded truck and/or trailer. To that end, the block may be formed of cast metal or machined metal stock such as steel, titanium, and aluminum and may be a beam (e.g., an S-beam), a rod, a shaft, or any other suitable rigid structure.

The first set of strain gage pockets are circular open-ended holes extending inwardly from opposite sides of the load cell at an offset from the center of the load cell. The strain gage pockets are aligned with each other on a common axis.

The second set of strain gage pockets are similar to strain gage pockets of the first set. That is, the second set of strain gage pockets are circular open-ended holes extending inwardly from front and rear sides of the load cell at an offset from the center of the load cell opposite the first set of strain gage pockets. The strain gage pockets of the second set are aligned with each other on a common axis parallel to the axis of the first set of strain gage pockets.

The cable tunnels are through-holes extending from the front side of the load cell into one of the strain gage pockets to allow cables (e.g., communication and/or electrical wires) to be connected to the electronic circuits. In one embodiment, the cable tunnels include two tunnels that merge together before opening into the strain gage pocket. The cable tunnels may also include helical threads or other geometry near the front side for attaching cable connectors or the like to the internal cables or wires of the load cell.

The electronics interconnect tunnels extend between the strain gage pockets for receiving interconnecting wires therethrough. In one embodiment, three electronics interconnect tunnels pass between the strain gage pockets of each strain gage pocket set.

The inlet potting tunnels extend from the right end of the load cell into the first set of strain gage pockets and may include helical threads or other geometry near the right end of the load cell. The inlet potting tunnels may be offset above or below a central axis of the load cell.

The intermediate potting tunnels extend from the first set of strain gage pockets to the second set of strain gage pockets. The intermediate potting tunnels may be offset above or below the central axis of the load cell.

The outlet potting tunnels extend from the second set of strain gage pockets to the left end of the load cell and may include helical threads or other geometry near the left end of the load cell. The outlet potting tunnels may be offset above or below the central axis of the load cell.

The strain gages are positioned in the strain gage pockets for detecting strain in the block. In one embodiment, one strain gage is positioned in each strain gage pocket so as to form a Wheatstone bridge. The strain gages may be semiconductor (e.g., piezoresistor) strain gages, foil gages, fiber optic gages, microscale gages, capacitive strain gages, vibrating wire strain gages, analog strain gages or any other suitable gages.

The electronic circuits are positioned in some or all of the strain gage pockets and may comprise printed circuit boards, circuit tape, wires, and the like. The electronic circuits may also include computer chips, resistors, capacitors, diodes, and the like. The electronic circuits are connected to each other and the strain gages via wires passing through the electronics interconnect tunnels and/or the intermediate potting tunnels.

The potting material fills the interconnected cavities (strain gage pockets, cable tunnels, electronics interconnect tunnels, inlet potting tunnels, intermediate potting tunnels, and outlet potting tunnels). Importantly, the potting material occupies crevices and spaces formed by the strain gages, electronic circuits, and cables and wires.

The covers are saddle-shaped discs configured to enclose the strain gages, electronic circuits, and potting material in the strain gage pockets. The covers may be configured to sit in grooves at least partially encircling the strain gage pockets so that the covers are flush with the front and rear sides of the load cell.

The load cell is filled with potting material as follows: First, the load cell is positioned in a fixture such that the inlet potting tunnels are disposed downward and the outlet potting tunnels are disposed upward. The load cell is then secured in the fixture via a clamp with pressure being applied to the covers positioned over the strain gage pockets.

The potting material is then injected into the interconnected cavities via the inlet potting tunnels. The potting material flows from the inlet potting tunnels into the first set of strain gage pockets and adjacent electronics interconnect tunnels. The potting material then continues from the first set of strain gage pockets through the intermediate potting tunnels into the second set of strain gage pockets, cable tunnels, and adjacent electronics interconnect tunnels. The potting material then passes from the second set of strain gage pockets through the outlet potting tunnels.

The potting material is prevented from backflowing out of the inlet potting tunnels and thus settles such that trapped air works its way out of the interconnected cavities and is replaced by potting material. In this way, the interconnected cavities are completely filled with potting material. In particular, spaces and crevices formed by the strain gages, electronic circuits, cables, and wires are completely filled with potting material. The potting material also bonds to the inward facing sides of the covers, thus bonding the covers and securing them to the block.

The potting material is then cured. This can be performed at room temperature, but a higher temperature (e.g., 95° F.) speeds up the curing process and reduces curing time. This also helps maintain curing consistency by removing climatic variables such as daily temperature and humidity changes.

The inlet potting tunnels and outlet potting tunnels are then capped with set screws to seal them closed. Temporary fasteners such as sacrificial adhesive-backed vinyl or tape strips are then removed from the outward-facing sides of the covers.

The above-described load cell provides several advantages. For example, the potting material completely fills the interconnected cavities and in particular the strain gage pockets so that moisture cannot enter them. The potting material also fills crevices and spaces formed by the strain gages, electronic circuits, and cables and wires. This prevents moisture from being wicked along the cables and wires into direct contact with the strain gages and electronic circuits. The potting material also retains the covers over the strain gage pockets, which eliminates the need for the covers to be sealed and secured to the block via fasteners, welding, or separate adhesives.

Another embodiment of the load cell broadly includes a block, a number of strain gages and electronic circuits, a potting material, and a number of covers. The block houses or otherwise supports the strain gages and electronic circuits and includes a first set of strain gage pockets, a second set of strain gage pockets, a set of cable tunnels, a set of electronics interconnect tunnels, an inlet potting tunnel, a set of intermediate potting tunnels, and an outlet potting tunnel.

The cable tunnels, electronics interconnect tunnels, and intermediate potting tunnels are substantially similar to the tunnels described above. That is, the cable tunnels extend to one of the strain gage pockets for allowing cables to be connected to the electronic circuits. The electronics interconnect tunnels extend between strain gage pockets within each set of strain gage pockets. The intermediate potting tunnels extend between strain gage pockets of the first set of strain gage pockets and strain gage pockets of the second set of strain gage pockets.

The inlet potting tunnel extends from the left end of the load cell into a first strain gage pocket of the first set of strain gage pockets and may include helical threads or other geometry near the left end of the load cell. The outlet potting tunnel extends from a second strain gage pocket of the first set of strain gage pockets to the left end of the load cell and may include helical threads or other geometry near the left end of the load cell.

The load cell is filled with potting material as follows: First, the load cell is positioned in a fixture such that the inlet potting tunnel and outlet potting tunnel are disposed upward. The load cell is then secured in the fixture via a clamp with pressure being applied to the covers positioned over the strain gage pockets.

The potting material is then injected into the interconnected cavities via the inlet potting tunnel. The potting material flows from the inlet potting tunnel into the first strain gage pocket of the first set of strain gage pockets. The potting material then continues from the first strain gage pocket of the first set of strain gage pockets through one of the intermediate potting tunnels into a first strain gage pocket of the second set of strain gage pockets. The potting material crosses over to a second strain gage pocket of the first set of strain gage pockets and a second strain gage pocket of the second set of strain gage pockets via the electronics interconnect tunnels. The potting material also flows to the second strain gage pocket of the first set of strain gage pockets from the second strain gage pocket of the second set of strain gage pockets via another one of the intermediate potting tunnels. The potting material then continues through the outlet potting tunnel. The potting material is then cured as described above.

The above-described load cell provides several advantages in addition to the advantages described above. For example, the potting material naturally settles into the interconnected cavities. Fewer tunnels may be used in this embodiment, especially if the electronics interconnect tunnels double as crossover potting tunnels. This simplifies design and assembly and reduces the amount of waste used during assembly.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention may be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to the drawing figures, a load cell 10 constructed in accordance with embodiments of the invention is illustrated. The load cell 10 is configured to be positioned between a load cell stand and a weighbridge. The load cell stand may be a base, a frame, a mounting bracket, a clamp, or any other suitable support structure. The weighbridge may be a platform, a ramp, an isolated floor, or any other suitable weigh structure.

An embodiment of the load cell 10 will now be described in detail. The load cell 10 broadly comprises a block 12, a plurality of strain gages 14, a plurality of electronic circuits 16, a potting material 18, and a plurality of covers 20. The load cell 10 may be a shear beam load cell, a double-ended shear beam load cell, a compression load cell, an S-type load cell, a load pin load cell, or any other type of load cell.

The block 12 houses the strain gages 14 and electronic circuits 16 and includes opposing top and bottom sides 22, 24, opposing front and rear sides 26, 28, and opposing left and right ends 30, 32, load cell stand structure 34, weighbridge structure 36, a first set of strain gage pockets 38A,B, a second set of strain gage pockets 40A,B, a set of cable tunnels 42, a set of electronics interconnect tunnels 44, a set of inlet potting tunnels 46A,B, a set of intermediate potting tunnels 48A,B, and a set of outlet potting tunnels 50A,B. The block 12 is constructed to undergo a small amount of strain under the weight of the object being weighed. To that end, the block 12 may be formed of cast metal or machined metal stock such as steel, titanium, and aluminum and may be a beam (e.g., an S-beam), a rod, a shaft, or any other suitable rigid structure.

Figure 1:
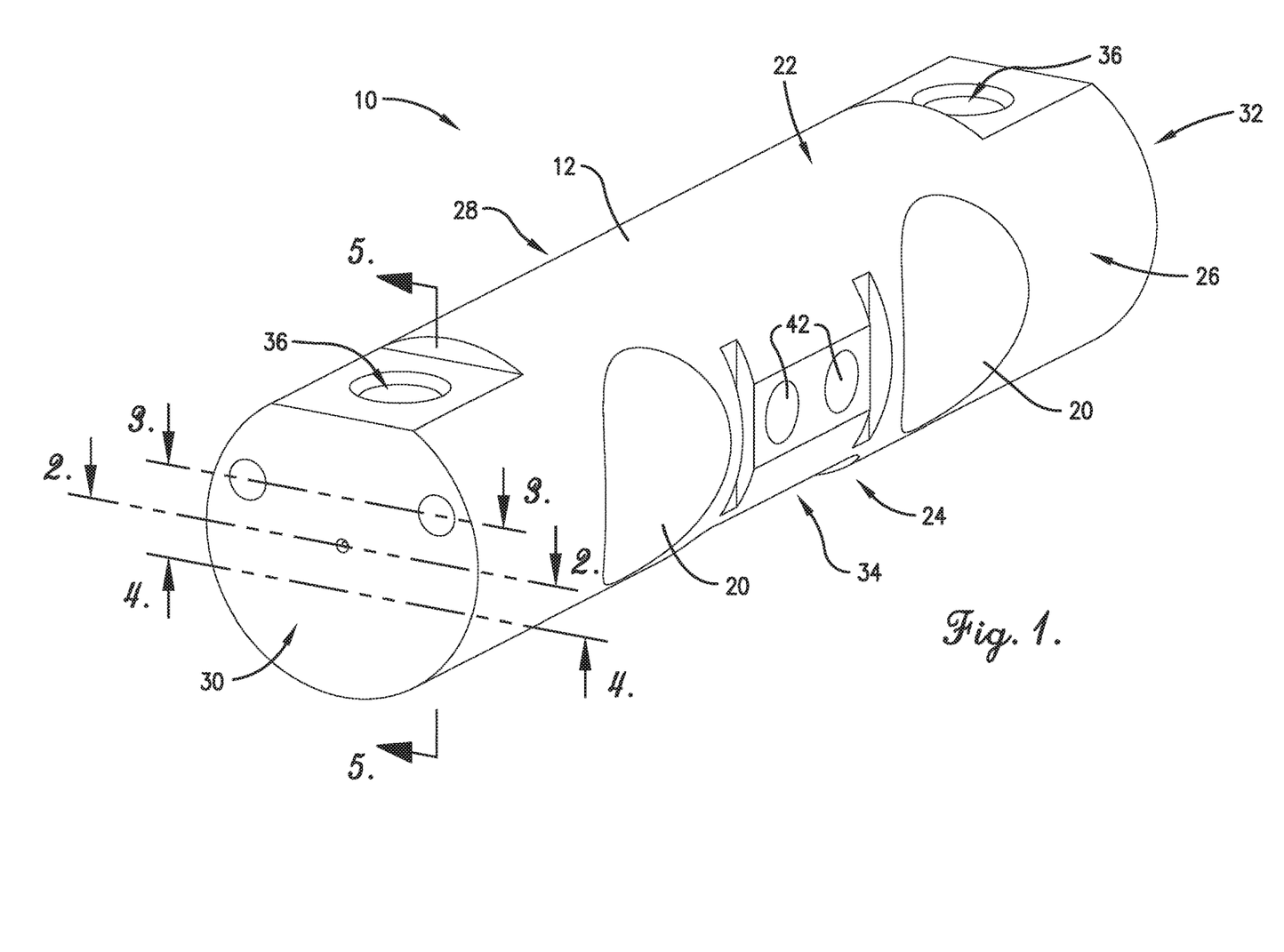
FIG. 1 is a perspective view of a load cell constructed in accordance with an embodiment of the invention.

The load cell stand structure 34 engages a mounting boss or other support structure of the load cell stand and may include grooves, a recess, a planar region, bolt holes, or any other suitable complementary geometry. The load cell stand structure 34 may be disposed near a midpoint of the load cell 10 (between the weighbridge structure 36) for forming a double-ended shear beam.

The weighbridge structure 36 allows a weighbridge to be mounted onto the block 12 and may include a set of threaded or smooth vertically extending channels for receiving bolts therein and a planar region on the top side 22 of the block 12 for abutting optional shims positioned between the weighbridge and the block 12. The weighbridge structure 36 may be disposed near both the left and right ends 30, 32, thus forming ends of the double-ended shear beam.

Figure 2:
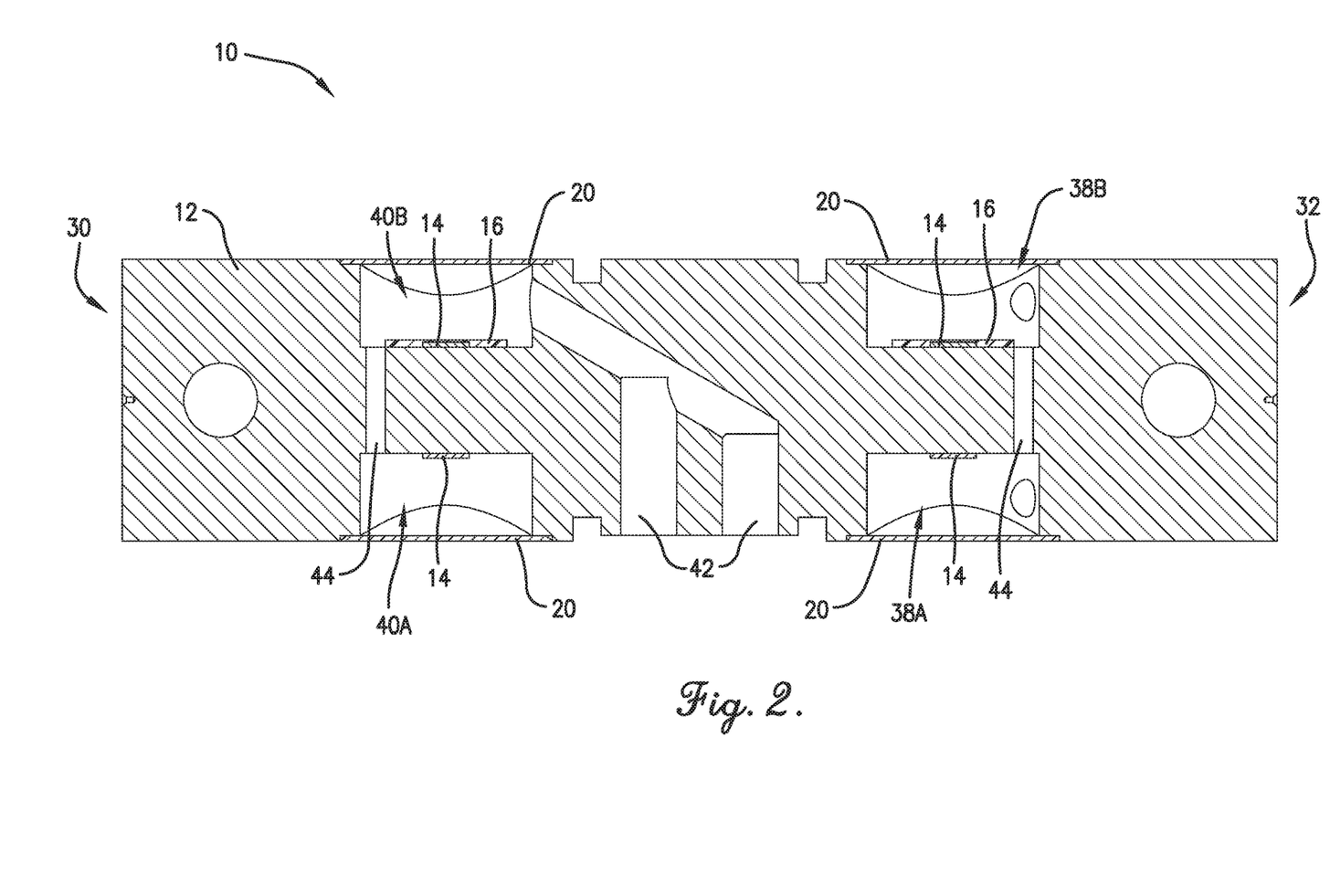
FIG. 2 is a top plan cutaway view of the load cell of FIG. 1.
Figure 3:
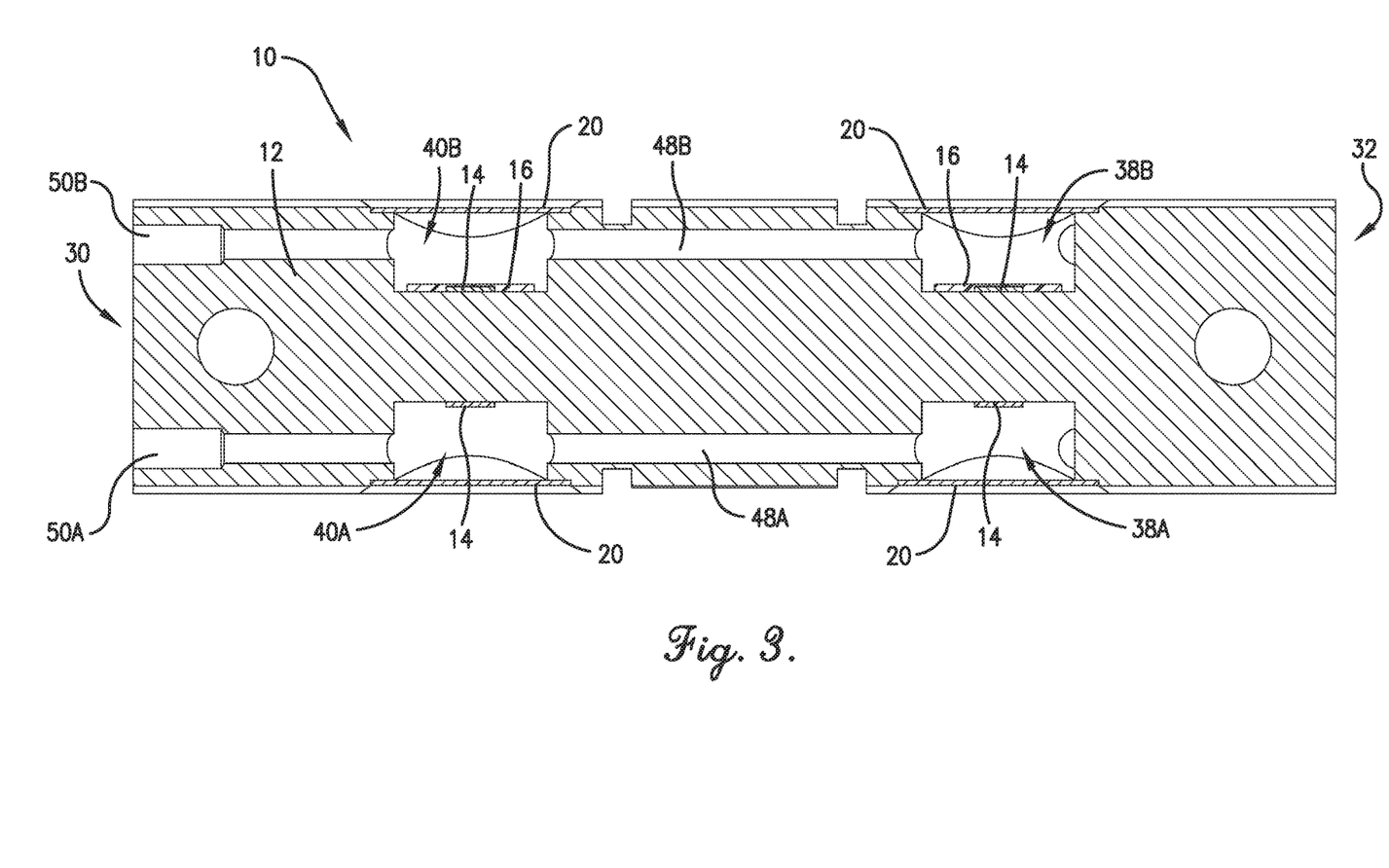
FIG. 3 is another top plan cutaway view of the load cell of FIG. 1.

The first set of strain gage pockets 38A,B may be circular open-ended holes extending inwardly from opposite sides (front side 26 and rear side 28) of the load cell 10 at an offset from the center of the load cell 10. In one embodiment, the strain gage pockets 38A,B may be aligned with each other on a common axis.

The second set of strain gage pockets 40A,B are similar to the first set of strain gage pockets 38A,B. That is, the second set of strain gage pockets 40A,B may be circular open-ended holes extending inwardly from opposite sides (front side 26 and rear side 28) of the load cell 10 at an offset from the center of the load cell opposite the first set of strain gage pockets 38A,B.

The cable tunnels 42 allow cables (e.g., communication and/or electrical wires) to be connected to the electronic circuits 16 and are through-holes extending from the front side 26 of the load cell 10 into one of the strain gage pockets 38A,B, 40A,B. In one embodiment, the cable tunnels 42 include two tunnels that merge together before opening into the strain gage pocket. The cable tunnels 42 may also include helical threads or other geometry near the front side 26 for attaching cable connectors or the like to the internal cables of the load cell 10.

The electronics interconnect tunnels 44 extend between the strain gage pockets 38A,B 40A,B for receiving interconnecting wires therethrough. In one embodiment, three electronics interconnect tunnels 44 pass between the strain gage pockets within each set of strain gage pockets 38A,B, 40A,B.

Figure 4:
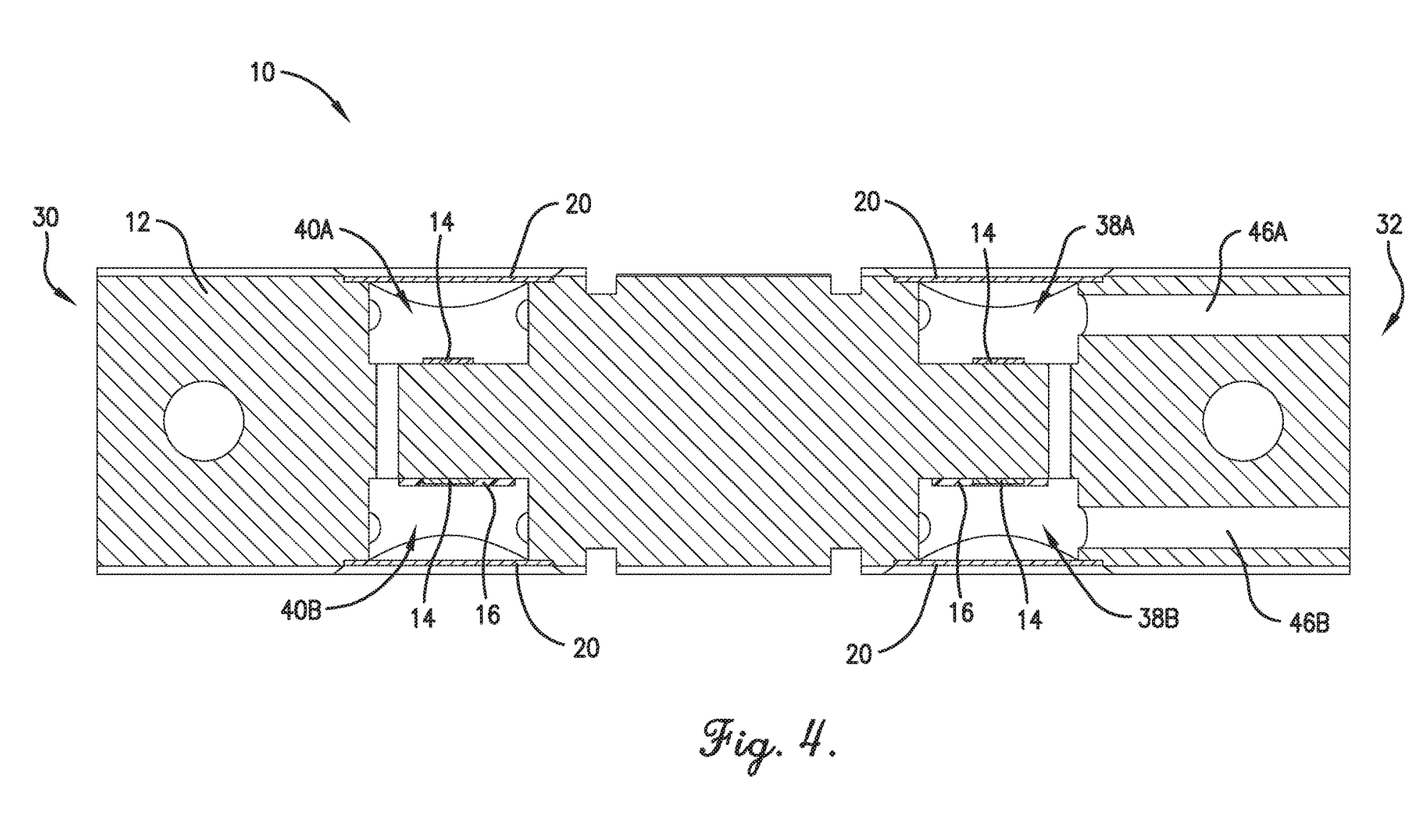
FIG. 4 is a bottom plan cutaway view of the load cell of FIG. 1.

The inlet potting tunnels 46A,B extend from the right end 32 of the load cell 10 into the first set of strain gage pockets 38A,B and may include helical threads or other geometry near the right end 32 for attaching potting tubes thereto and for receiving set screws therein, as described in more detail below. The inlet potting tunnels 46A,B may be offset above or below a central axis of the load cell 10. Although two inlet potting tunnels 46A,B are shown, it will be understood that any number of inlet potting tunnels may be used.

The intermediate potting tunnels 48A,B extend from the first set of strain gage pockets 38A,B to the second set of strain gage pockets 40A,B. The intermediate potting tunnels 48A,B may be offset above or below the central axis of the load cell 10. The intermediate potting tunnels 48A,B may also be axially aligned with the inlet potting tunnels 46A,B, the outlet potting tunnels 50A,B or offset from both the inlet potting tunnels 46A,B and the outlet potting tunnels 50A,B. Although two intermediate potting tunnels 48A,B are shown, it will be understood that any number of intermediate potting tunnels may be used.

The outlet potting tunnels 50A,B extend from the second set of strain gage pockets 40A,B to the left end 30 of the load cell 10. The outlet potting tunnels 50A,B may be offset above or below the central axis of the load cell 10. The outlet potting tunnels 50A,B may be axially aligned with the inlet potting tunnels 46A,B and/or the intermediate potting tunnels 48A,B. Although two outlet potting tunnels 50A,B are shown, it will be understood that any number of outlet potting tunnels may be used. It will also be understood that the inlet potting tunnels 46A,B and outlet potting tunnels 50A,B may be reversed or used interchangeably.

The strain gages 14 are positioned in the strain gage pockets 38A,B, 40A,B for detecting strain in the block 12. In one embodiment, one strain gage 14 is positioned in each strain gage pocket 38A,B, 40A,B so as to form a Wheatstone bridge. The strain gages 14 may be semiconductor (e.g., piezoresistor) strain gages, foil gages, fiber optic gages, microscale gages, capacitive strain gages, vibrating wire strain gages, analog strain gages, or any other suitable gages.

The electronic circuits 16 are positioned in some or all of the strain gage pockets 38A,B, 40A,B and may comprise printed circuit boards, circuit tape, wires, and the like. The electronic circuits 16 may also include computer chips, resistors, capacitors, diodes, and the like. The electronic circuits 16 are connected to each other and the strain gages 14 via wires passing through the electronics interconnect tunnels 44 and/or the intermediate potting tunnels 48A,B. The electronic circuits 16 also may include connectors, sockets, or ports for connecting cables, or for connecting external electronic components via cables passing through the cable tunnels 42.

The potting material 18 fills the interconnected cavities (strain gage pockets 38A,B, 40A,B, cable tunnels 42, electronics interconnect tunnels 44, inlet potting tunnels 46A,B, intermediate potting tunnels 48A,B, and outlet potting tunnels 50A,B), and crevices and spaces formed by the strain gages 14, electronic circuits 16, and cables and wires. The potting material 18 may be Polyurethane (PRUR) 3030 potting material manufactured by Prairie Technology Group mixed at a ratio of 1:1 or any other suitable potting material, substance, or mixture.

Figure 5:
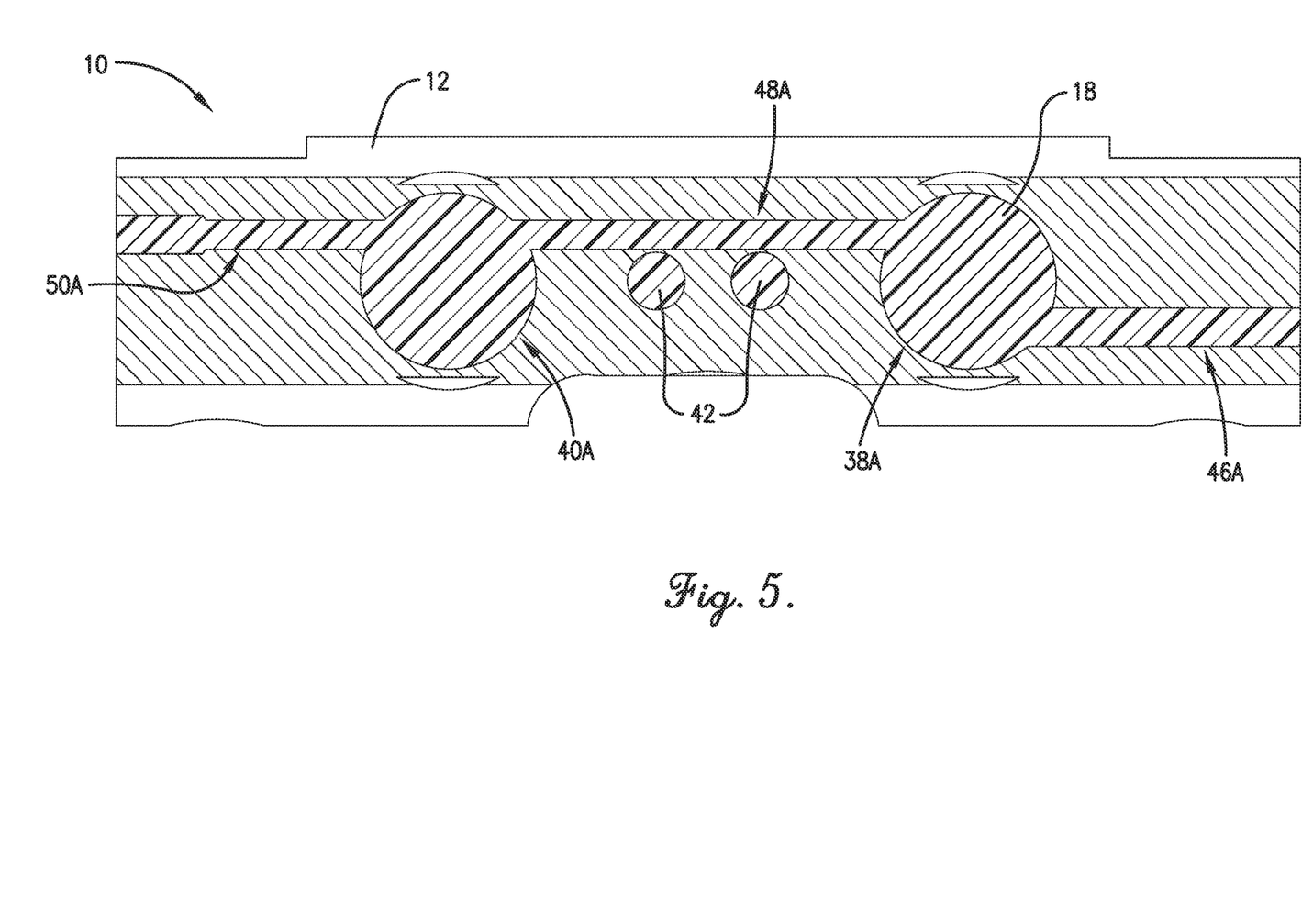
FIG. 5 is a front elevation cutaway view of the load cell of FIG. 1.

The covers 20 enclose the strain gages 14, electronic circuits 16, and potting material 18 in the strain gage pockets 38A,B, 40A,B and may be saddle-shaped discs. Alternatively, the covers 20 may be flat, angled, rectangular, elongated, or any other suitable shape. The covers 20 may be configured to sit in grooves at least partially encircling the strain gage pockets 38A,B, 40A,B so that the covers 20 are flush with the front and rear sides 26, 28 of the load cell 10.

Assembly of the load cell 10 will now be described in detail. First, the load cell stand structure 34, weighbridge structure 36, and interconnected cavities (strain gage pockets 38A,B, 40A,B, cable tunnels 42, electronics interconnect tunnels 44, inlet potting tunnels 46A,B, intermediate potting tunnels 48A,B, and outlet potting tunnels 50A,B) may be machined into the block 12. Alternatively, these features may be formed via casting or additive manufacturing techniques. The strain gages 14 and electronic circuits 16 are then installed in the strain gage pockets 38A,B, 40A,B and communicatively coupled together via cables and/or wires passing through electronics interconnect tunnels 44 and/or intermediate potting tunnels 48A,B.

The load cell 10 may then be baked in a 95° F. environment for approximately two hours. This removes moisture from the load cell 10 and particularly from the strain gages 14, electronic circuits 16, and cables and wires.

Figure 6:
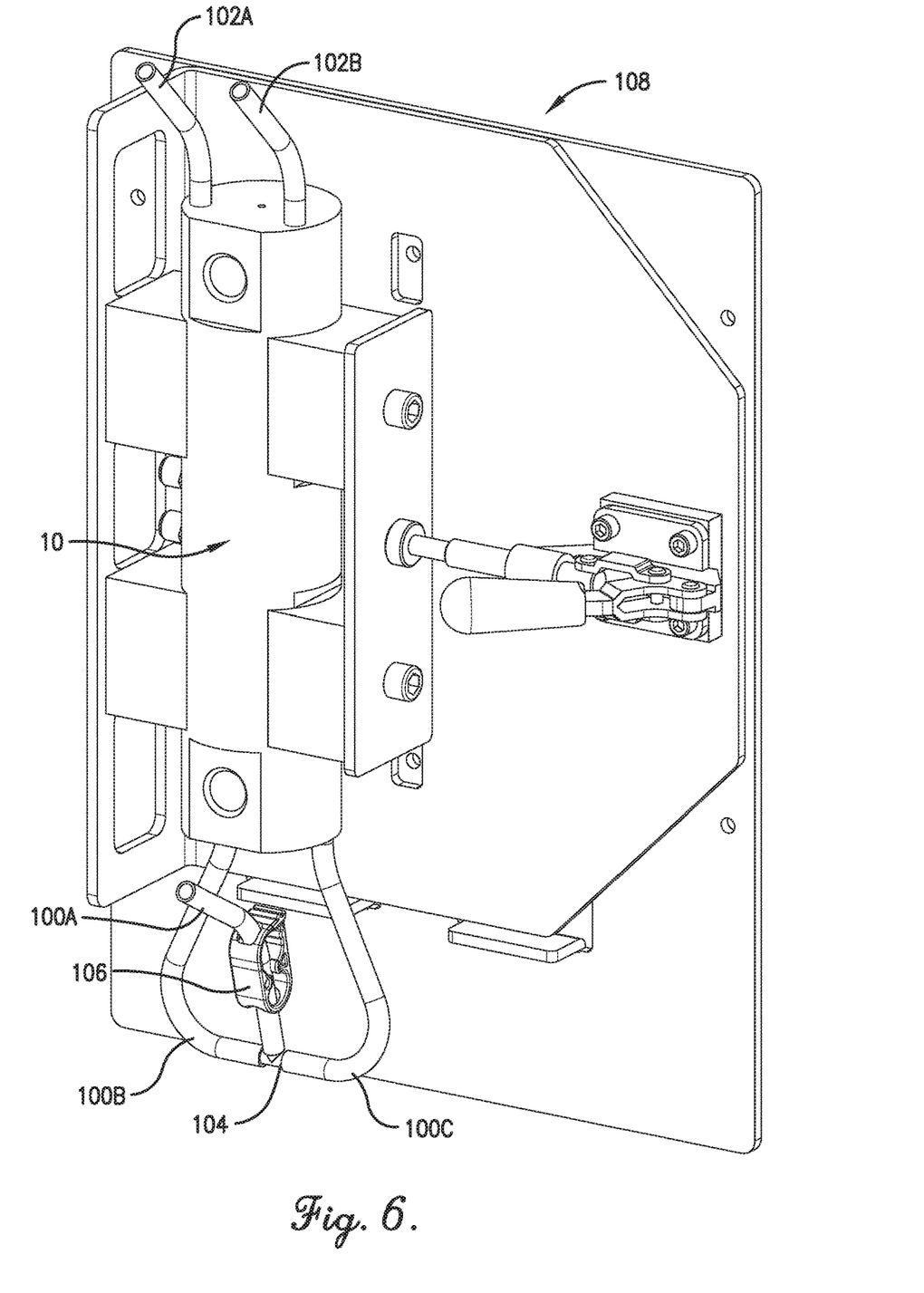
FIG. 6 is a perspective view of the load cell of FIG. 1 positioned in a clamping apparatus for being injected with potting material.

Inlet potting tubes 100A-C, and outlet potting tubes 102A,B may then be prepared by cutting tube sections from a tube roll and applying isopropyl alcohol or another suitable lubricant to the tube sections. The inlet potting tubes 100B,C are then threaded into ends of the inlet potting tunnels 46A,B, and the outlet potting tubes 102A,B are threaded into ends of the outlet potting tunnels 50A,B. The potting tubes 100B,C, 102A,B may be directly connected to the block 12 or may be indirectly connected to the block 12 via plastic or metal barbed fittings.

The free ends of the inlet potting tubes 100B,C may then be attached to a 3-way connector such as a T-fitting 104. The inlet potting tube 100A is then attached to the unused connection of the T-fitting 104. A clamp 106 or valve is then attached to the inlet potting tube 100A in an open configuration. The inlet potting tube 100A should be oriented so that it extends upward from the T-fitting 104 when the load cell 10 is turned upward as described below.

The covers 20 may then be prepared by first coating their inward-facing sides in a primer such as "Pruriprimer" manufactured by Prairie Technology Group. The primer is also applied to annular grooves at least partially encircling the strain gage pockets 38A,B, 40A,B and any portion of the block 12 that the covers 20 may touch. Sacrificial adhesive-backed vinyl or other similar tape strips are then attached to the outward-facing sides of the covers 20. The covers 20 are then positioned in the annular grooves so that they cover the strain gage pockets 38A,B, 40A,B. The sacrificial vinyl or tape strips temporarily secure the covers 20 in place.

The load cell 10 may then be positioned in a fixture 108 such that the inlet potting tunnels 46A,B and inlet potting tubes 100B,C are disposed downward and the outlet potting tunnels 50A,B and outlet potting tubes 102A,B are disposed upward. The inlet potting tube 100A, should extend upward from the T-fitting 104. The load cell 10 is then secured in the fixture via a clamp or bracket with pressure being applied to the covers 20. The clamp may be automated and/or pneumatic, and the fixture 108 may have locating pins or other geometry for decreasing handling time in this step.

The potting material 18 may then be injected into the interconnected cavities of the load cell 10 via the inlet potting tube 100A. To that end, a syringe or an injection gun and pneumatic air pumping system or any other suitable automated system may be used. In one embodiment, air pressure in the pneumatic air pumping system is approximately 20 psi. The potting material 18 may also be mixed together from separate containers immediately prior to injection via a mixing nozzle located on the injection gun.

The potting material flows into the inlet potting tube 100A, through the T-fitting 104 and the inlet potting tubes 100B,C, and into the inlet potting tunnels 46A,B. The potting material 18 continues from the inlet potting tunnels 46A,B into the first set of strain gage pockets 38A,B and adjacent electronics interconnect tunnels 44. The potting material 18 then continues from the first set of strain gage pockets 38A,B through the intermediate potting tunnels 48A,B into the second set of strain gage pockets 40A,B, cable tunnels 42, and adjacent electronics interconnect tunnels 44. The potting material 18 then continues from the second set of strain gage pockets 40A,B through the outlet potting tunnels 50A,B into the outlet potting tubes 102A,B.

Once some of the potting material 18 enters the outlet potting tubes 102A,B, the clamp 106 is closed to prevent the potting material 18 from draining back out of the load cell 10. Meanwhile, the potting material 18 in the load cell 10 settles such that trapped air works its way out of the interconnected cavities via the outlet potting tubes 102A,B and is replaced by potting material 18 in the outlet potting tubes 102A,B. In this way, the interconnected cavities are completely filled with potting material 18. In particular, spaces and crevices formed by the strain gages 14, electronic circuits 16, and cables and wires are completely filled with potting material 18. The potting material 18 also bonds to the inward facing sides of the covers 20, the purpose of which will be explained below.

In one embodiment, approximately 90 cc of potting material may be required to completely fill the interconnected cavities. However, it will be understood that more or less potting material 18 may be needed depending on the size of the load cell 10 and the complexity of the strain gages 14 and electronic circuits 16 (and hence the size and complexity of the interconnected cavities).

The potting material 18 is then cured. This can be performed at room temperature, but a higher temperature (e.g., 95° F.) speeds up the curing process and reduces curing time to approximately two hours. This also helps maintain curing consistency by removing climatic variables such as daily temperature and humidity changes. The potting material 18 takes approximately 26 minutes to gel and approximately 24 hours to fully cure at room temperature.

The inlet potting tubes 100A-C and outlet potting tubes 102A,B are then removed from the ends of the inlet potting tunnels 46A,B and outlet potting tunnels 50A,B. Set screws are then inserted into the ends of the inlet potting tunnels 46A,B and outlet potting tunnels 50A,B to seal the potting material 18 in the load cell 10.

The sacrificial adhesive-backed vinyl or tape strips are then removed from the outward-facing sides of the covers 20. The cured potting material 18 bonds the covers 20 in place from within the strain gage pockets 38A,B, 40A,B.

The above-described assembly may be streamlined in several ways. For example, the fixture 108 may have integrated tubing, channels, and/or fittings that allow an operator to position the load cell 10 in the fixture 108 so that the load cell 10 clicks or locks in place, with the integrated tubing, channels, and/or fittings of the fixture 108 matching up with and engaging the openings of the load cell 10. For example, a user may position the load cell 10 in the fixture 108 and push downward slightly on the load cell 10 so that the load cell 10 is ready to receive potting material. This can significantly decrease the assembly time and tubing waste.

The above-described load cell 10 provides several advantages. For example, the potting material 18 completely fills the interconnected cavities and in particular the strain gage pockets 38A,B, 40A,B so that moisture cannot enter them. The potting material 18 also fills crevices and spaces formed by the strain gages, electronic circuits, and cables and wires. This prevents moisture from being wicked along the cables and wires into direct contact with the strain gages 14 and electronic circuits 16. The potting material 18 also retains the covers 20 over the strain gage pockets 38A,B, 40A,B, which eliminates the need for the covers 20 to be sealed and secured to the block 12 via fasteners, welding, or separate adhesives.

Figure 7:
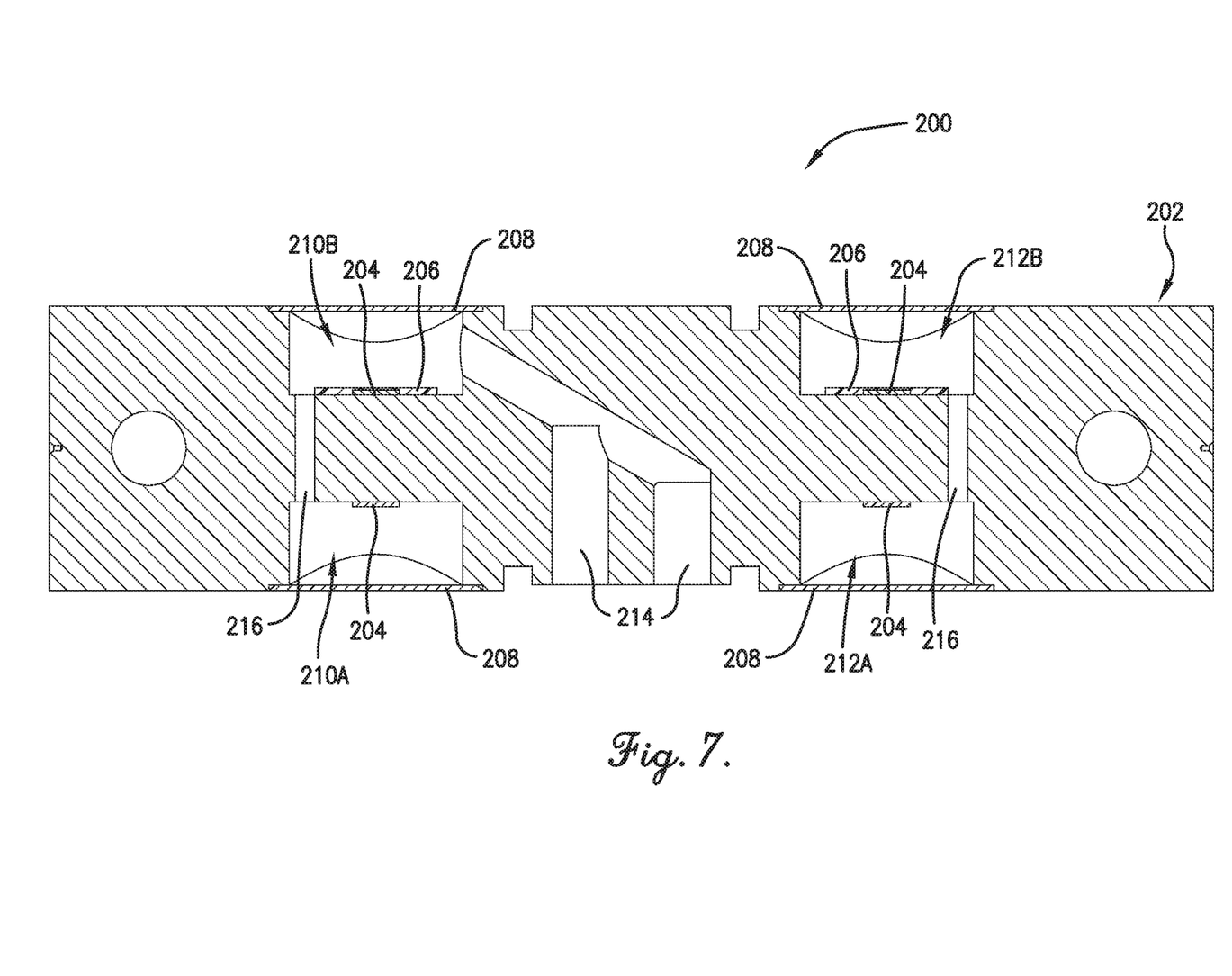
FIG. 7 is a top plan cutaway view of a load cell constructed in accordance with another embodiment of the invention.
Figure 8:
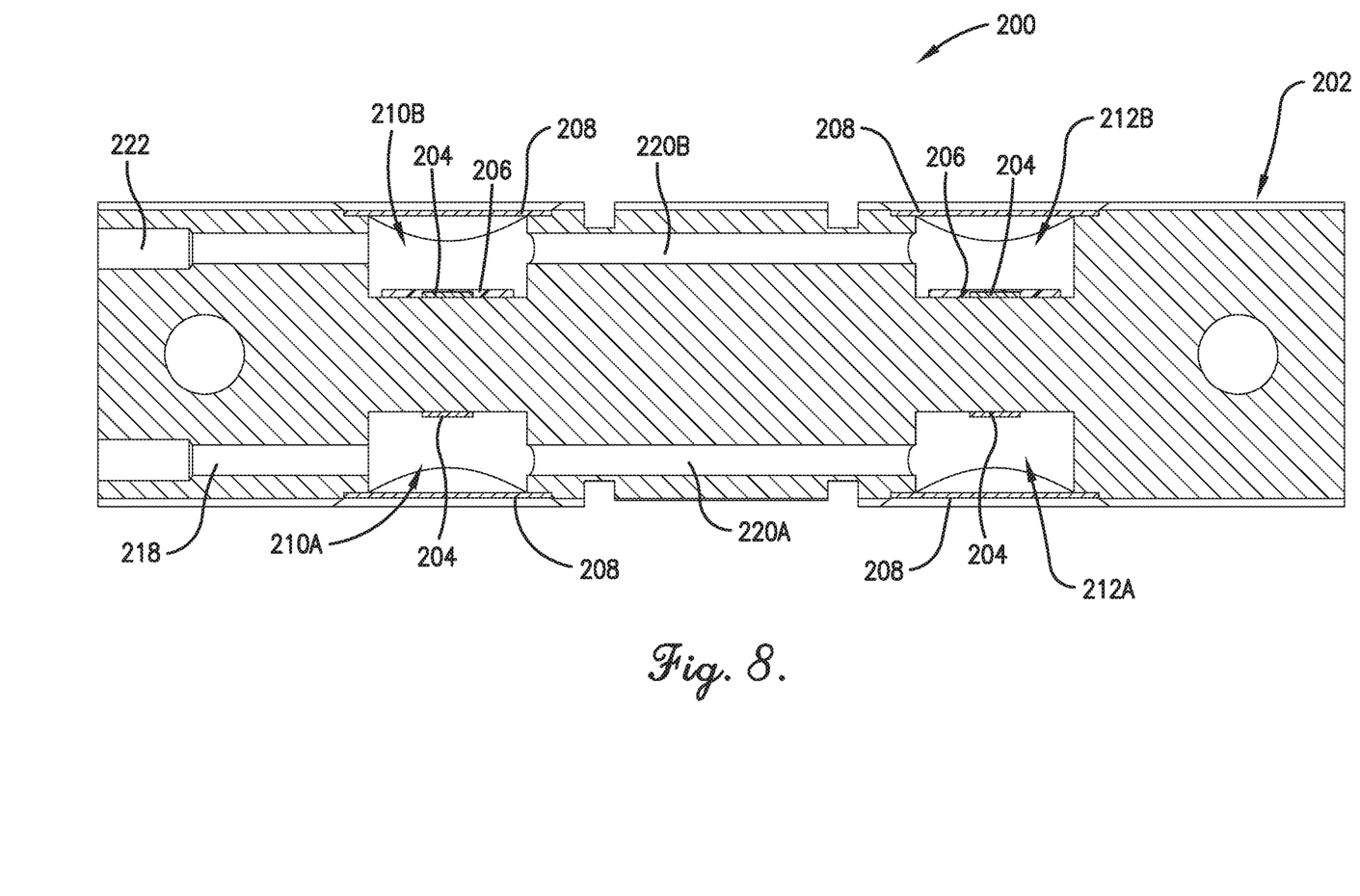
FIG. 8 is another top plan cutaway view of the load cell of FIG. 7.
Figure 9:
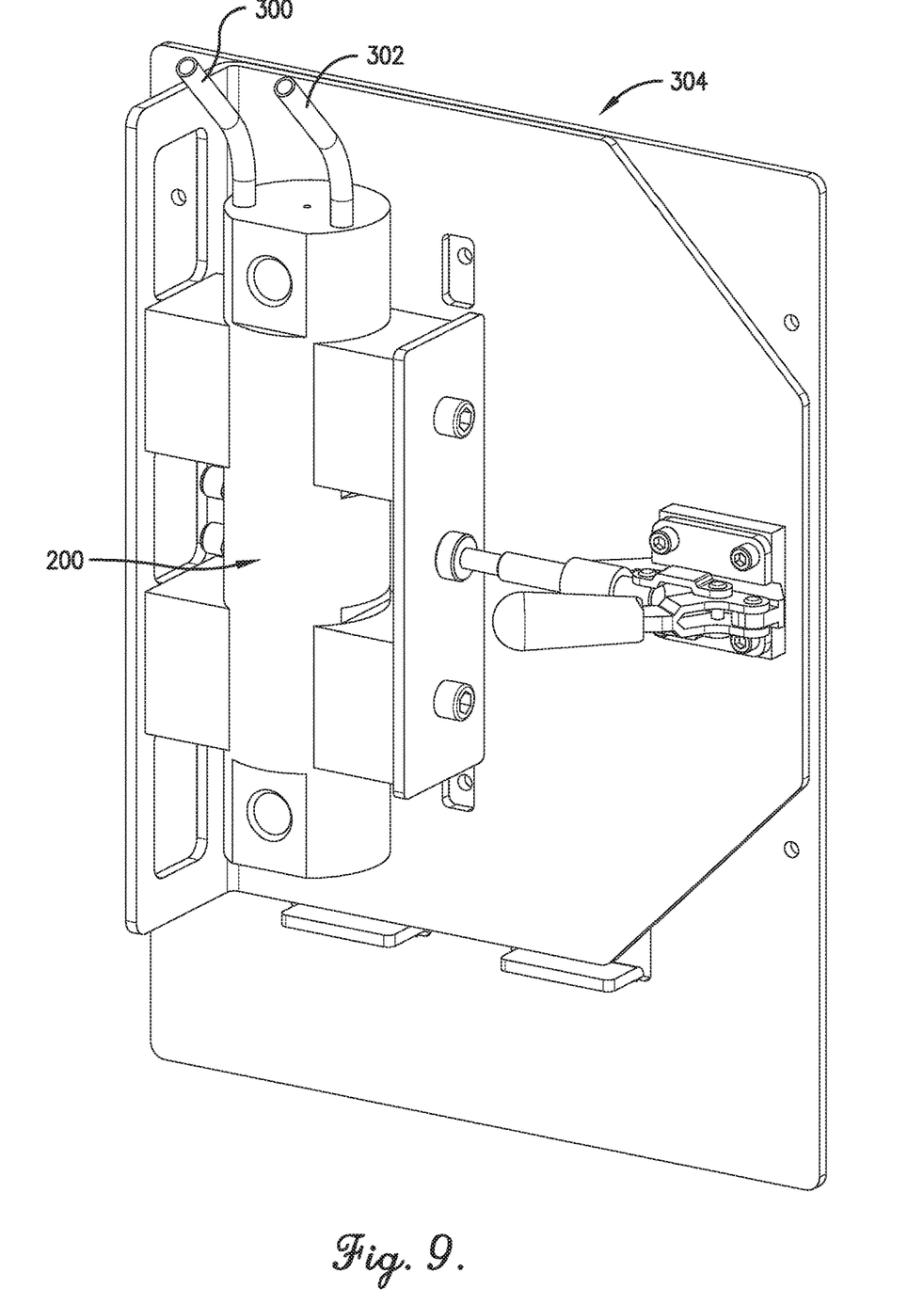
FIG. 9 is a perspective view of the load cell of FIG. 9 positioned in a clamping apparatus for being injected with potting material.

Turning to FIGS. 7-9, a load cell 200 constructed in accordance with another embodiment is illustrated. The load cell 200 broadly comprises a block 202, a plurality of strain gages 204, a plurality of electronic circuits 206, a potting material, and a plurality of covers 208. The load cell 200 may be a shear beam load cell, a double-ended shear beam load cell, a compression load cell, an S-type load cell, a load pin load cell, or any other type of load cell.

The block 202 houses the strain gages 204 and electronic circuits 206 and includes opposing top and bottom sides, opposing front and rear sides, and opposing left and right ends, load cell stand structure, weighbridge structure, a first set of strain gage pockets 210A,B, a second set of strain gage pockets 212A,B, a set of cable tunnels 214, a set of electronics interconnect tunnels 216, an inlet potting tunnel 218, a set of intermediate potting tunnels 220A,B, and an outlet potting tunnel 222. The load cell stand structure and weighbridge structure are substantially similar to the load cell stand structure and weighbridge structure described above and thus will not be discussed further. The block 202 is constructed to undergo a small amount of strain under the weight of the object being weighed. To that end, the block 202 may be formed of cast metal or machined metal stock such as steel, titanium, and aluminum and may be a beam (e.g., an S-beam), a rod, a shaft, or any other suitable rigid structure.

The strain gages 204 and electronic circuits 206 are substantially similar to the above strain gages and electronic circuits and thus will not be described further. The first set of strain gage pockets 210A,B and second set of strain gage pockets 212A,B are substantially similar to the above first set of strain gage pockets and second set of strain gage pockets and thus will not be described further. The cable tunnels 214 and electronics interconnect tunnels 216 are substantially similar to the above cable tunnels and electronics interconnect tunnels and thus will not be described further.

The inlet potting tunnel 218 extends from the left side of the load cell 200 into the strain gage pocket 210A and may include helical threads or other geometry near its end for attaching a potting tube thereto and for receiving a set screw therein, as described in more detail below. The inlet potting tunnel 218 may be offset above or below a central axis of the load cell 200. Although one inlet potting tunnel 218 is shown, it will be understood that any number of inlet potting tunnels may be used.

The intermediate potting tunnels 220A,B are substantially similar to the intermediate potting tunnels described above. That is, the intermediate potting tunnels 220A,B extend between the first set of strain gage pockets 210A,B and the second set of strain gage pockets 212A,B.

The outlet potting tunnel 222 extends from the strain gage pocket 210B to the left side of the load cell 200 and may include helical threads or other geometry near its end for attaching a potting tube thereto and for receiving a set screw therein, as described in more detail below. The outlet potting tunnel 222 may be offset above or below a central axis of the load cell 200. Although one outlet potting tunnel 222 is shown, it will be understood that any number of outlet potting tunnels may be used. It will also be understood that the inlet potting tunnel 218 and the outlet potting tunnel 222 may extend from the right side of the load cell 200 instead of the left side. Note that unlike in the previous embodiment, the inlet potting tunnel 218 and the outlet potting tunnel 222 are on the same side of the load cell 200, and that there are no potting tunnels on the opposite side of the load cell 200, the purpose of which will be explained below.

The potting material and covers 208 are substantially similar to the potting material and covers described above. For example, the potting material fills the interconnected cavities (strain gage pockets 210A,B, 212A,B, cable tunnels 214, electronics interconnect tunnels 216, inlet potting tunnel 218, intermediate potting tunnels 220A,B, and outlet potting tunnel 222), and crevices and spaces formed by the strain gages 204, electronic circuits 206, and cables and wires.

Assembly of the load cell 200 will now be described in more detail. First, the load cell stand structure, weighbridge structure, and interconnected cavities (strain gage pockets 210A,B, 212A,B, cable tunnels 214, electronics interconnect tunnels 216, inlet potting tunnel 218, intermediate potting tunnels 220A,B, and outlet potting tunnel 222) may be machined into the block 202. Alternatively, these features may be formed via casting or additive manufacturing techniques. The strain gages 204 and electronic circuits 206 are then installed in the strain gage pockets 210A,B, 212A,B and communicatively coupled together via cables and/or wires passing through electronics interconnect tunnels 216 and/or intermediate potting tunnels 220A,B.

The load cell 200 may then be baked in a 95° F. environment for approximately two hours. This removes moisture from the load cell 200 and particularly from the strain gages 204, electronic circuits 206, and cables and wires.

An inlet potting tube 300, and an outlet potting tube 302 may then be prepared by cutting tube sections from a tube roll and applying isopropyl alcohol or another suitable lubricant to the tube sections. The inlet potting tube 300 is then threaded into the end of the inlet potting tunnel 218, and the outlet potting tube 302 is threaded into the end of the outlet potting tunnel 222. The potting tubes 300, 302 may be directly connected to the block 202 or may be indirectly connected to the block 202 via plastic or metal barbed fittings.

The covers 208 may then be prepared by first coating their inward-facing sides in a primer such as "Pruriprimer" manufactured by Prairie Technology Group. The primer is also applied to annular grooves at least partially encircling the strain gage pockets 210A,B, 212A,B and any portion of the block 202 that the covers 208 may touch. Sacrificial adhesive-backed vinyl or other similar tape strips are then attached to the outward-facing sides of the covers 208. The covers 208 are then positioned in the annular grooves so that they cover the strain gage pockets 210A,B, 212A,B. The sacrificial vinyl or tape strips temporarily secure the covers 208 in place.

The load cell 200 may then be positioned in a fixture 304 such that the inlet potting tunnel 218, inlet potting tube 300, outlet potting tunnel 222, and outlet potting tube 302 are disposed upward. The load cell 200 is then secured in the fixture via a clamp or bracket with pressure being applied to the covers 208. The clamp may be automated and/or pneumatic, and the fixture 304 may have locating pins or other geometry for decreasing handling time in this step.

The potting material may then be injected into the interconnected cavities of the load cell 200 via the inlet potting tube 300. To that end, a syringe or an injection gun and pneumatic air pumping system or any other suitable automated system may be used. In one embodiment, air pressure in the pneumatic air pumping system is approximately 20 psi. The potting material may also be mixed together from separate containers immediately prior to injection via a mixing nozzle located on the injection gun.

The potting material flows through the inlet potting tube 300 and into the inlet potting tunnel 218. The potting material continues from the inlet potting tunnel 218 into the strain gage pocket 210A. The potting material then continues from the strain gage pocket 210A through the intermediate potting tunnel 220A into the strain gage pocket 212A. The potting material crosses over from the strain gage pockets 210A and 212A into the strain gage pockets 212B and 210B via the electronics interconnect tunnels 216. The potting material also passes between the strain gage pockets 210B, 212B via the intermediate potting tunnel 220B. The potting material also fills the cable tunnels 214. The potting material then continues from the strain gage pocket 210B through the outlet potting tunnel 222 into the outlet potting tube 302. Note that although the potting material is described to cross over via the electronics interconnect tunnels 216, separate crossover potting tunnels may be used instead.

Once some of the potting material enters the outlet potting tube 302, the potting material in the load cell 200 is allowed to settle such that trapped air works its way out of the interconnected cavities via the outlet potting tube 302 and inlet potting tube 300 and is replaced by potting material in the outlet potting tube 302 and inlet potting tube 300. In this way, the interconnected cavities are completely filled with potting material. In particular, spaces and crevices formed by the strain gages 204, electronic circuits 206, and cables and wires are completely filled with potting material. The potting material also bonds to the inward facing sides of the covers 208.

In one embodiment, approximately 90 cc of potting material may be required to completely fill the interconnected cavities. However, it will be understood that more or less potting material may be needed depending on the size of the load cell 200 and the complexity of the strain gages 204 and electronic circuits 206 (and hence the size and complexity of the interconnected cavities).

The potting material is then cured. This can be performed at room temperature, but a higher temperature (e.g., 95° F.) speeds up the curing process and reduces curing time to approximately two hours. This also helps maintain curing consistency by removing climatic variables such as daily temperature and humidity changes. The potting material takes approximately 26 minutes to gel and approximately 24 hours to fully cure at room temperature.

The inlet potting tube 300 and outlet potting tube 302 are then removed from the ends of the inlet potting tunnel 218 and outlet potting tunnel 222. Set screws are then inserted into the ends of the inlet potting tunnel 218 and outlet potting tunnel 222 to seal the potting material in the load cell 200.

The sacrificial adhesive-backed vinyl or tape strips are then removed from the outward-facing sides of the covers 208. The cured potting material bonds the covers 208 in place from within the strain gage pockets 210A,B, 212A,B.

The above-described assembly may be streamlined in several ways. For example, the fixture 304 may have integrated tubing, channels, and/or fittings that allow an operator to position the load cell 200 in the fixture 304 so that the load cell 200 clicks or locks in place, with the integrated tubing, channels, and/or fittings of the fixture 304 matching up with and engaging the openings of the load cell 200. For example, a user may position the load cell 200 in the fixture 304 and swing a top cap over the load cell 200 so that the load cell 200 is ready to receive potting material via the top cap. This can significantly decrease the assembly time and tubing waste.

The above-described load cell 200 provides several advantages in addition to the advantages described above. For example, the potting material settles into the interconnected cavities from the inlet potting tube 300 and outlet potting tube 302 since they are positioned above the load cell 200. Fewer tunnels may be used in this embodiment, especially if the electronics interconnect tunnels 216 double as crossover potting tunnels. This simplifies design and assembly and reduces the amount of waste such as the number of potting tubes and unused potting material.

Although the invention has been described with reference to the exemplary embodiments illustrated in the attached drawings, it is noted that equivalents may be employed and substitutions made herein without departing from the scope of the invention as recited in the claims.

Having thus described various embodiments of the invention, what is claimed as new and desired to be protected by Letters Patent includes the following:

1. A load cell for measuring a force applied thereto by an object for determining a weight of the object, the load cell comprising:
    a rigid block configured to be supported on a load cell stand and configured to support a weighbridge, the rigid block including opposing first and second ends and comprising:
        a plurality of interconnected cavities extending into the rigid block, the plurality of interconnected cavities including:
            a first set of at least two strain gage pockets spaced from the first end of the rigid block;

a second set of at least two strain gage pockets spaced between the first set of two strain gage pockets and the second end of the rigid block;

an inlet potting tunnel extending from the first end of the rigid block to a first strain gage pocket of the first set of at least two strain gage pockets;

an intermediate potting tunnel extending from the first strain gage pocket of the first set of at least two strain gage pockets to a first strain gage pocket of the second set of at least two strain gage pockets;

an interconnect tunnel extending from the first strain gage pocket of the second set of at least two strain gage pockets to a second strain gage pocket of the second set of at least two strain gage pockets;

an intermediate potting tunnel extending from the second strain gage pocket of the second set of at least two strain gage pockets to a second strain gage pocket of the first set of at least two strain gage pockets;

an outlet potting tunnel extending from the second strain gage pocket of the second set of at least two strain gage pockets to the first end of the rigid block; and a cable tunnel extending to one of the strain gage pockets and configured to receive an electronic cable therethrough;

a plurality of strain gages positioned in the strain gage pockets; and a potting material filling the plurality of interconnected cavities such that moisture and debris cannot enter the strain gage pocket.

2. The load cell of claim 1, further comprising a plurality of covers enclosing the strain gages in the strain gage pockets, the potting material retaining the covers over the strain gage pockets.

3. The load cell of claim 1, wherein the rigid block is formed of metal stock and the strain gage pockets, the cable tunnel, the inlet potting tunnel, the intermediate potting tunnels, the interconnect tunnel, and the outlet potting tunnel are machined into the rigid block.

4. The load cell of claim 1, wherein the load cell further comprises an electronic circuit including a connector for connecting an electronic cable thereto, the connector forming a number of spaces when connected to the electronic cable, the potting material filling the spaces.

5. A method of assembling a load cell, the method comprising the steps of:

positioning a plurality of strain gages in a plurality of strain gage pockets of a rigid block configured to be supported on a load cell stand and configured to support a weighbridge, the plurality of strain gage pockets including a first set of strain gage pockets spaced from a first end of the rigid block and a second set of strain gage pockets spaced between the first set of strain gage pockets and a second end of the rigid block opposite the first end;

filling a first strain gage pocket of the first set of strain gage pockets with a potting material via an inlet potting tunnel extending from the first end of the rigid block to the first strain gage pocket of the first set of strain gage pockets;

filling a first strain gage pocket of the second set of strain gage pockets with the potting material via an intermediate potting tunnel extending from the first strain gage pocket of the first set of strain gage pockets to the first strain gage pocket of the second set of strain gage pockets;

filling a second strain gage pocket of the second set of strain gage pockets with the potting material via an interconnect tunnel extending from the first strain gage pocket of the second set of strain gage pockets to the second strain gage pocket of the second set of strain gage pockets;

filling a second strain gage pocket of the first set of strain gage pockets with the potting material via an intermediate potting tunnel extending from the second strain gage pocket of the second set of strain gage pockets to the second strain gage pocket of the first set of strain gage pockets;

filling a cable tunnel extending to one strain gage pocket of the plurality of strain gage pockets with the potting material via the one strain gage pocket; and passing at least some of the potting material out of an outlet potting tunnel extending from the second strain gage pocket of the first set of strain gage pockets to the first end of the rigid block such that moisture and debris cannot enter the plurality of strain gage pockets.

6. The method of claim 5, further comprising the steps of connecting a tube to the outlet potting tunnel and drawing at least some of the potting material from the outlet potting tunnel into the tube such that the potting material in the tube holds a filling pressure on the potting material in the plurality of strain gage pockets and the inlet potting tunnel so as to encourage the potting material to fill the plurality of strain gage pockets.

7. The method of claim 5, further comprising the step of connecting an electronic cable to an electronic circuit positioned in the one strain gage pocket of the plurality of strain gage pockets via the cable tunnel.

8. The method of claim 7, further comprising the step of machining the first set of strain gage pockets, the second set of strain gage pockets, the two inlet potting tunnel, the intermediate potting tunnels, the interconnect tunnel, the two outlet potting tunnel, and the cable tunnel into the rigid block.

9. The method of claim 5, further comprising the steps of positioning covers over the strain gage pockets, temporarily retaining the covers over the strain gage pockets via a fixture during the filling steps, curing the potting material such that the potting material permanently retains the covers over the strain gage pockets, and removing the fixture from the covers.

* * * * *